United States Patent [19]

Visser

[11] Patent Number: 5,421,146
[45] Date of Patent: Jun. 6, 1995

[54] RESTRICTED-DIMENSION APPARATUS AND METHOD FOR MECHANICALLY HARVESTING FRUIT

[76] Inventor: Thomas R. Visser, 1052 S. Riverdale Rd., Avon Park, Fla. 33825

[21] Appl. No.: 112,604

[22] Filed: Aug. 24, 1993

Related U.S. Application Data

[63] Continuation-in-part of Ser. No. 40,630, Mar. 31, 1993.
[51] Int. Cl.[6] ............................................. A01D 46/24
[52] U.S. Cl. .................................... 56/328.1; 56/339
[58] Field of Search ...................... 56/328.1, 329, 330, 56/333, 335, 337, 338, 339

[56] References Cited

U.S. PATENT DOCUMENTS

| | | | |
|---|---|---|---|
| 3,827,221 | 8/1974 | Chen | 56/328.1 |
| 4,192,125 | 3/1980 | Reynolds et al. | 56/328.1 |
| 4,202,158 | 5/1980 | Edwards | 56/329 X |
| 5,161,358 | 11/1992 | Crunkelton | 56/328.1 |

*Primary Examiner*—Terry Lee Melius
*Attorney, Agent, or Firm*—Allen, Dyer, Doppelt, Franjola & Milbrath

[57] ABSTRACT

A mechanical fruit harvester employs a fruit-picking unit having plural, flexible probes which are extended into the foliage of the tree. Each probe has retractable fingers for separating the fruit from the stem. Each probe is significantly flexible, in order to avoid damage to the unit and to the tree being harvested. In one arrangement, the harvester is free-standing and has restricted dimensions, in order to permit movement about substantially all of an individual fruit tree among a plurality of densely-spaced fruit trees. The restricted-dimensioned arrangement employs hydraulic motor means for operating the drive, the probe extension and the probe elevation features.

19 Claims, 10 Drawing Sheets

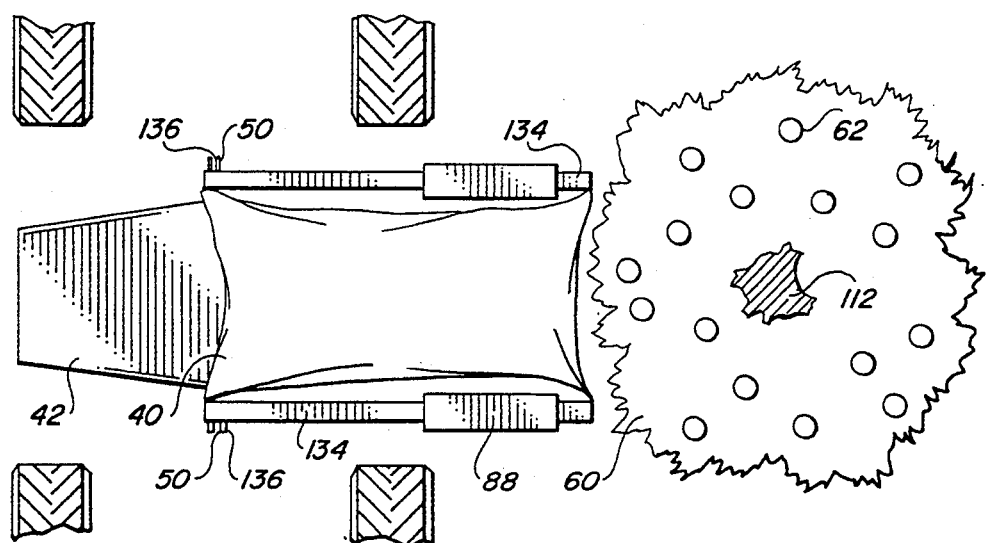
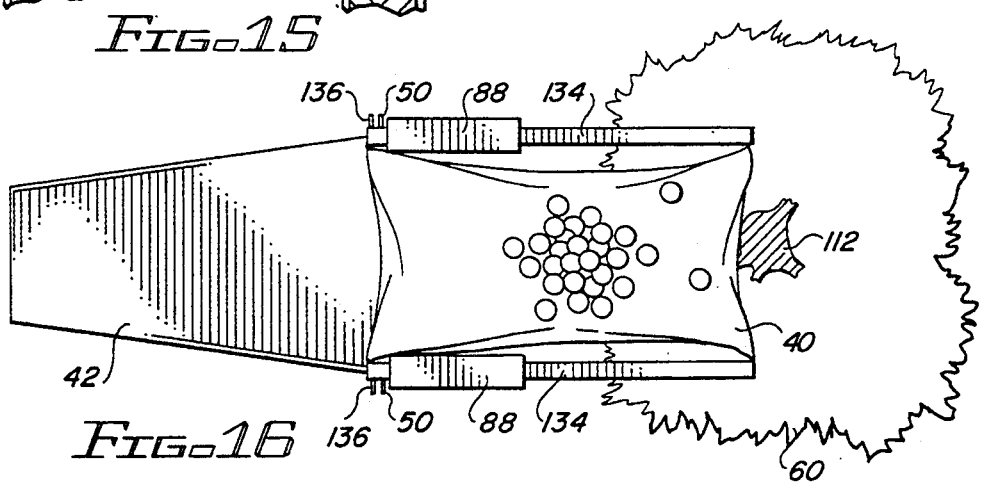
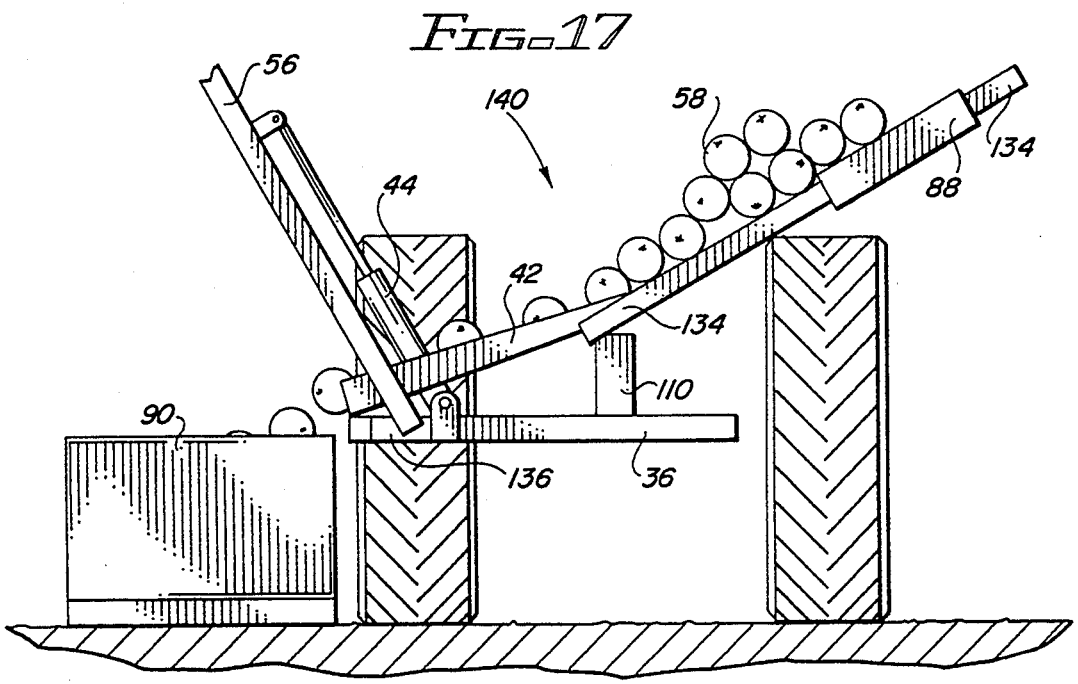

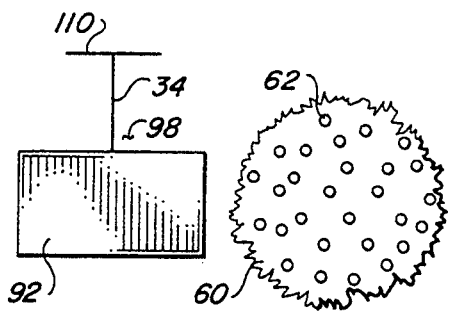
FIG._20
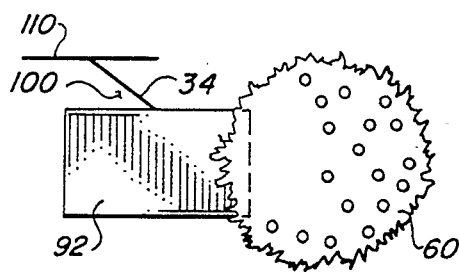
FIG._21
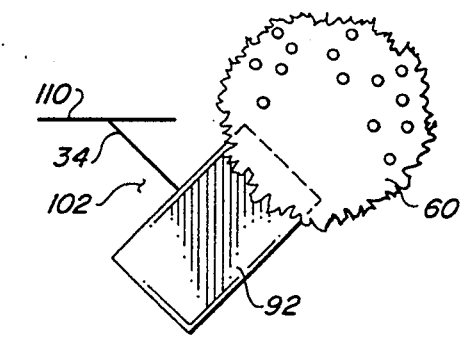
FIG._22
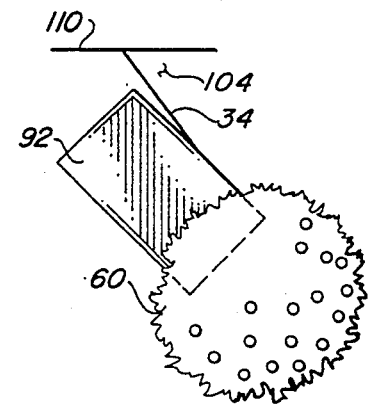
FIG._23
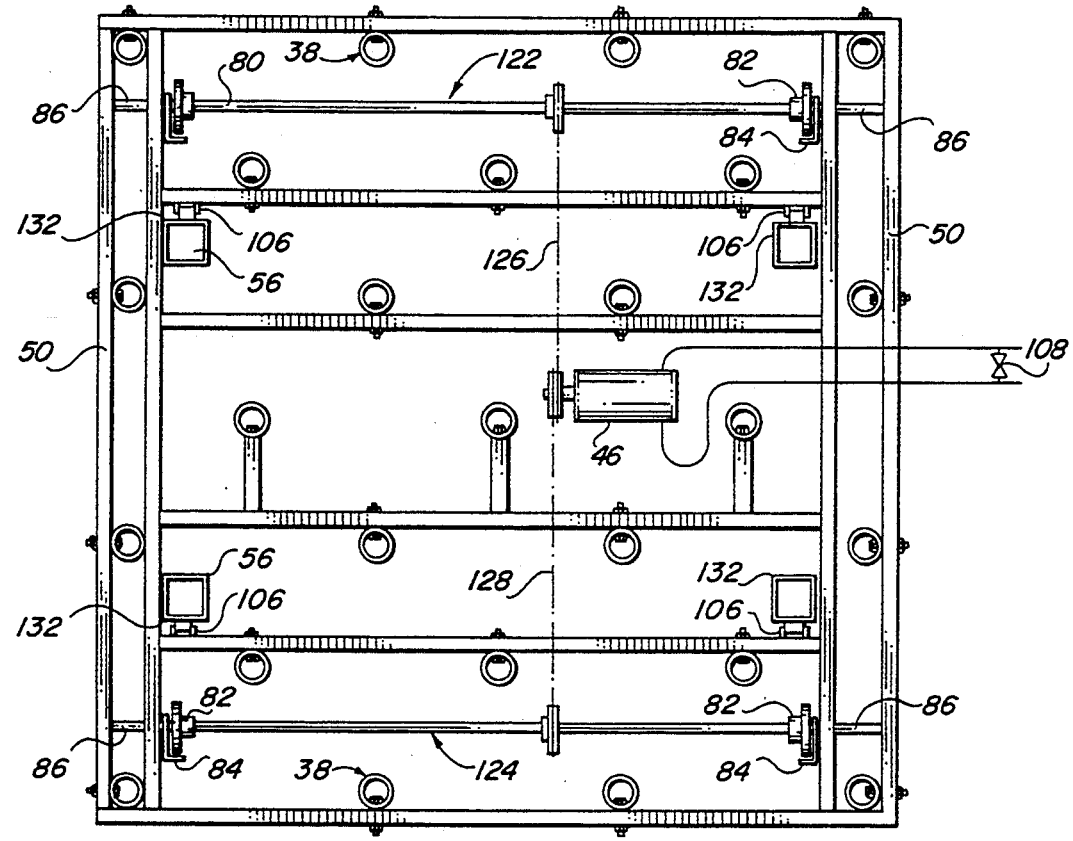
FIG._24

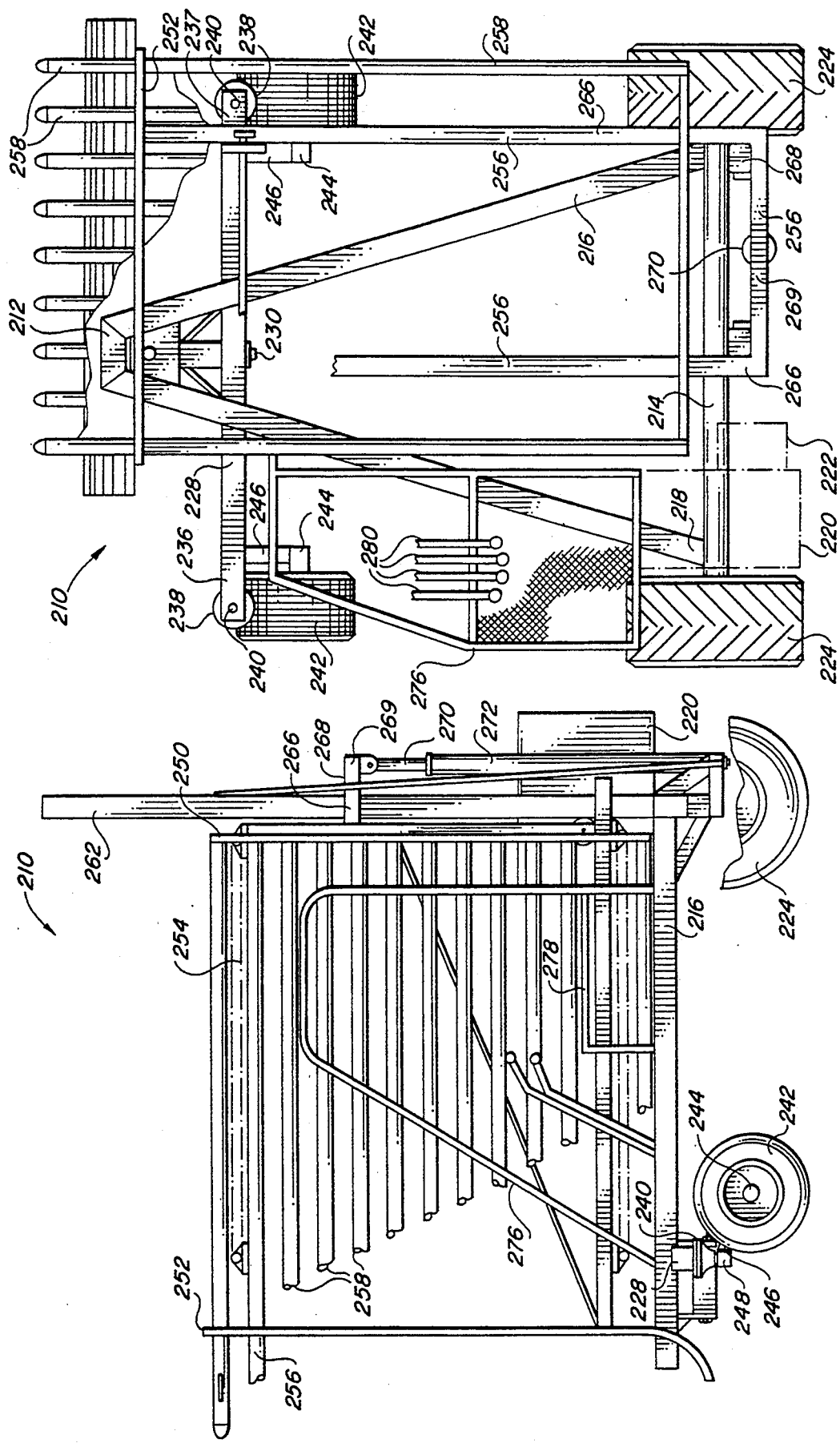

RESTRICTED-DIMENSION APPARATUS AND METHOD FOR MECHANICALLY HARVESTING FRUIT

This application is a continuation-in-part of copending application Ser. No. 08/040,630 filed Mar. 31, 1993.

BACKGROUND

This invention relates to mechanical pickers and fruit harvesters, and related methods.

DISCUSSION OF THE PRIOR ART

Although a significant amount of money and time have been spent on various techniques for mechanically picking fruit, the citrus industry has essentially abandoned such effort.

A summary of prior art techniques for mechanical harvesting is discussed by Grierson in Citrus Industry Magazine, July 1991 at page 74; another discussion of mechanical harvesting techniques is reported by Wilson et al in CITRUS, Ciba Geigy Technical Monograph No. 4, 1975 at page 67.

One prior art technique involves the mechanical shaking of the tree. Usually, the shaking of a tree results in some mutilation of the trunk, limbs or roots. Some "hard to pick" fruit like oranges are not easy to remove even by vigorously shaking the tree.

Other attempts have suggested the use of high technology computer-control robotics; however, such arrangements are cost prohibitive, slow and are not a reasonable solution to the problem. There has been suggested a method of hooking the stem end of the citrus fruit by Chen in U.S. Pat. No. 3,827,221 and Robbins et al in U.S. Pat. No. 4,163,356. Specifically, Chen employs rigid probes which extend into and out of the foliage, with fingers on the probes for engaging the stems of the fruit. Robbins et al utilize a meshing gear drive to rotate probes to achieve a similar separation between the fruit and the stem.

SUMMARY OF THE INVENTION

The present invention presents two embodiments of mechanical fruit harvesters which employ a compact fruit-picking unit having plural, elongated and flexible probes which may be extended into and out of the foliage of a citrus tree, and with each probe having retractable fingers at the extremity of the probe to effectuate a separation of the fruit from the stem. An important aspect of the fruit picking unit in accordance with the present invention is the utilization of elongated probes having a significant degree of flexibility in all directions, in order to avoid damage to either the unit or to the wood of the fruit tree being harvested (i.e., branches and trunk). This desired flexibility is achieved by utilizing probes formed of a thin wall plastic tubing having a capability of deflection at each probe extremity of at least about 30 inches, without structural damage to the probe.

In the first embodiment, the mechanical harvester utilizes the fruit picking unit mounted on a three point lift of an agricultural tractor, which utilizes the conventional power-take off of the tractor to operate the probes during the harvesting operation. As discussed previously, the probes have spring-loaded picking fingers mounted at its extremity to penetrate the tree canopy and separate the stem from the fruit during the harvesting operation, which is achieved during the movement of the probes relative to the tree.

The picked fruit is caught in the spring-loaded picking fingers of each probe, and then falls either to the ground or into a collection system.

The second embodiment of the apparatus and method for mechanically harvesting fruit in accordance with the present invention comprises a free-standing chassis having a front and a rear and opposing first and second sides, with a pair of spaced, ground-engaging drive wheels at either the front or the rear for propelling the harvester. Short radius turning means are fitted to the other of the front or rear of the chassis, a fruit-picking unit essentially similar to that described above with reference to the first embodiment is mounted on the chassis along the first side, with the unit extending from a proximal end at the rear of the chassis and forwardly to a distal end beyond the front of the chassis. The fruit-picking unit includes plural, elongated and substantially flexible probes extending through the unit from the proximal end to the distal end. Means are provided for raising and lowering the fruit-picking unit relative to the chassis, and for extending the probes out of the distal end of the unit and into the foliage of an adjacent fruit tree. Means are also carried by the chassis for operating the drive wheels, the raising and lowering means in the probe-extending means. The second embodiment includes an operator station on the chassis extending between the front and rear along the second side and along side the fruit-picking unit, the overall dimension of the harvester between the front and rear of the chassis and its width being specifically restricted so that the chassis may be moved in forward and reverse directions generally parallel with the direction between the front and rear and then rotated about an imaginary axis at the rear of the chassis, to thereby permit the restricted-dimension chassis to move about substantially all of an individual fruit tree among a plurality of densely-spaced fruit trees. Typically, the dimensions of the chassis together with the fruit-harvesting unit will be restricted so that the length between the front and rear does not exceed about 75 percent of a spacing distance between adjacent fruit trees. However, an even shorter dimension is preferred. By way of example, a typical length and width for a free-standing fruit harvester in accordance with the second embodiment for use in an orange grove having typical spacing of 12 feet between adjacent trees would utilize a length between the front and rear of the harvester on the order of 7.5 feet, and a width between the opposing sides of 6.25 feet. It will thus be appreciated by those skilled in the art that the fruit harvester in accordance with the present invention is a free-standing and independently operated unit having a "foot print" on the order of about 55 square feet or less, and which can be easily maneuvered around substantially all of the periphery of an individual fruit tree, in a relatively easy and facile manner, in order to achieve the desired harvesting. When used in accordance with the present invention, the fruit harvester is employed with a series of forward, rearward and rotational direction changes about an imaginary axis substantially along the rear of the chassis, in order to position the chassis and the fruit-harvesting unit at different radial locations relative to the individual tree being harvested.

Further in accordance with the present invention, the free-standing harvester of the second embodiment is sufficiently light in weight and construction so as to use a small gasoline engine on the order of 16 h.p. to operate as the motive force for the drive wheels as well as to pressurize a hydraulic system for both raising and lowering the fruit-picking unit relative to the chassis and for extending the probes out of the distal end of the unit and into the foliage of an adjacent tree. Thus, the second embodiment of a fruit harvester in accordance with the present invention provides a very cost-effective technique and apparatus for mechanically harvesting fruit, while accomplishing the harvesting in a relatively complete and facile manner that has not heretofore been achieved with mechanical harvesters including those utilizing reciprocal probes for hooking the stem to separate the fruit.

In both embodiments, it is preferred that means be employed to direct the falling fruit away from the fruit-picking unit. To this end, the fruit-picking unit is provided with a forward shield through which the flexible probes pass, the shield having a bevelled curve below the probes for directing falling fruit away from the harvester. In the preferred arrangement of both embodiments, the harvester is provided with a flexible shield extending between the front of the chassis and the bottom of the fruit-picking unit, which flexible shield is reeled into and out of the chassis as the fruit-picking unit is raised and lowered relative to the chassis.

DESCRIPTION OF THE DRAWINGS

FIG. 15 is a plan view of the catching device being fully withdrawn.

FIG. 16 is a plan view of the catching device being fully extended.

FIG. 17 is an end view of the catching device being emptied.

FIG. 20 is a diagrammatic plan view of the picking device showing the positioning device in the normal mode.

FIG. 21 is a diagrammatic plan view of the picking device showing the positioning device in the sideways extended mode.

FIG. 22 is a diagrammatic plan view of the picking device showing the positioning device in the sideways forward mode.

FIG. 23 is a diagrammatic plan view of the picking device showing the positioning device in the sideways backward mode.

FIG. 24 is a typical cross section view of the carriage, its drive and support, the plane of which is indicated by line 24—24 in FIG. 12.

FIG. 28 is a side view of the embodiment of FIGS. 26 and 27, in which a portion of the fruit-picking probes are cut-away for illustration purposes.

FIG. 29 is a top view of the embodiment of FIGS. 26–28, in which a portion of the fruit-picking unit is cut-away.

DETAILED DESCRIPTION OF FIGS. 1–6, 11–17 AND 24

Figure 1:
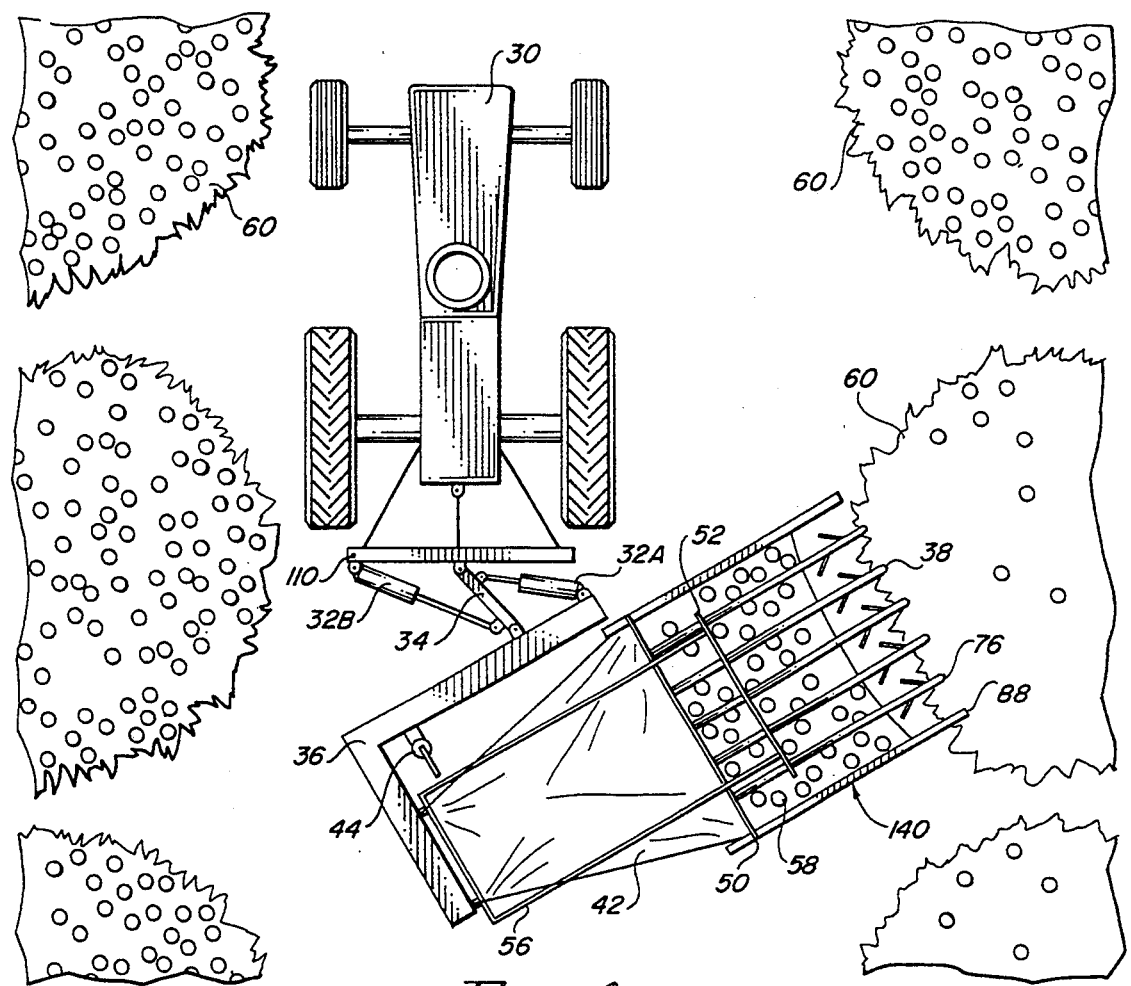
FIG. 1 shows a plan view of the picker in action.
Figure 2:
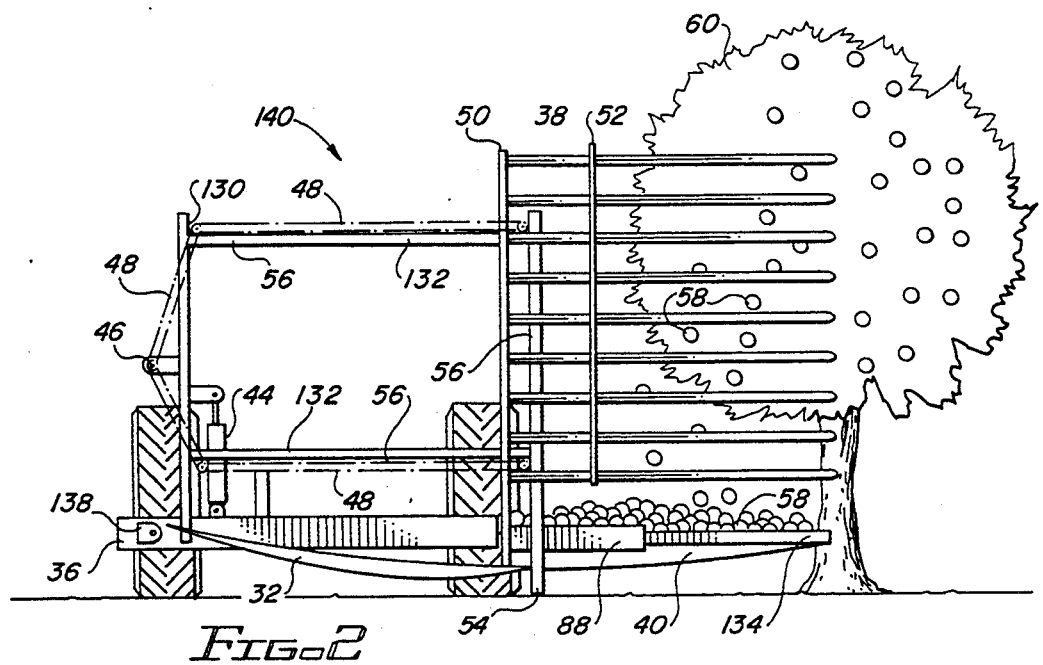
FIG. 2 shows an end view of the picker in action.
Figure 14:
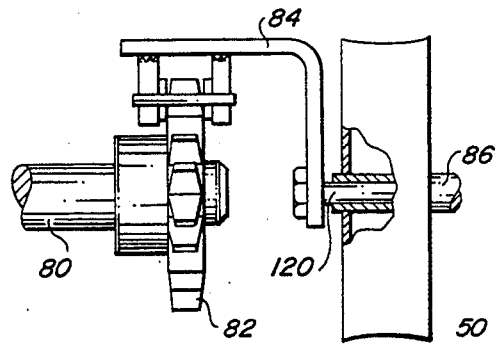
FIG. 14 is an end view of the attachment device.

In reference to FIG. 2 a series of probes 38 having picking fingers 64 mounted thereon are connected to a carriage 50 and are guided by a guide 52. The carriage 50 is connected via a chain drive mechanism 122 and 124 and an hydraulic motor 46 shown on FIG. 11. A Bracket 84 shown in FIG. 14, is connected to the drive mechanisms 122 and 124. Guide 50 is connected to a frame 56. This frame 56 is pivotal connected to a toolbar 36. FIG. 1 illustrates how toolbar 36 is connected via a double hinge 34 to a tractor hitch 110. A catcher frame 134 is connected to the carriage by a hitch bracket 136.

A typical embodiment or the fruit picker of the present invention is illustrated in FIG. 1 (top view) and FIG. 2 (end view).

Figure 3:
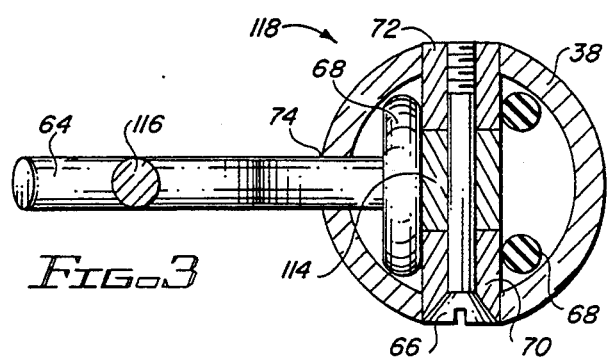
FIG. 3 is a cross sectional view of the probe and picker finger, the plane of which is indicated by line 3—3 in FIG. 4.

In reference to FIG. 3 which shows a cross sectional view of the a flexible light weight probe 38. In accordance with the present invention, the light weight probe comprises a thin-walled plastic tube which has sufficient flexibility to permit deflection from its axial direction on the order of 30 inches without effectuating structural damage. By way of example, a polyvinyl chloride (PVC) tubing having an outer diameter of 1.5 inches and a wall thickness of 0.2 inches is suitable, with the overall probe length being on the order of 6.1 feet. A curved picker finger 64 of having uniform cross sectional diameter in at least one direction has a cylindrical base mounting sleeve 114 permanently attached to it. The inner diameter of the mounting sleeve 114 shown as the diameter is such than the countersunk bolt 66 fits in it. The length the mounting sleeve 114 is equal to the diameter of the picker finger 64 shown as cross sectional area 116. The mounting sleeve 114 is pivotal mounted on the probe 38. A pipe, tube or pivot sleeve 70 is convex shaped at the one end in order to accommodate the head of a countersunk bolt 66 to fit into the convex shaped end thereof. The outer diameter of the pivoting sleeve (countersunk) 70 is smaller than two holes diametrically opposed in the wall of the probe 38 in order to allow pivotal movement. The length of the pivoting sleeve (countersunk) 70 is equal to or just smaller than half the outer diameter of the probe 38 minus half the cylindrical length of the mounting sleeve 114. Another pipe, tube or pivoting sleeve 72 has the same outer diameter than the pivoting sleeve (countersunk) 70, the same length but threaded on the inside in order to allow the thread of the countersunk bolt 66 to mate with the threaded end of the pivoting sleeve (threaded) 72. The countersunk bolt 66 fits through the pivoting sleeve (countersunk) 70, the mounting sleeve 114 and mates into the pivoting sleeve (threaded) 72 to hold them together as a unit. The picker finger 64 extends through a slot or elongated hole 74, in the side wall of the probe 38. The position of the slotted hole 74 is parallel to the longitudinal axis of the probe 38 and the length sufficiently equal to the length of the curved part of the picker finger 64. The width of the slotted hole 74 is substantially equal to the picker cross sectional diameter 116.

A tension spring, rubber band, O ring or endless latex band 68 is hooked or attached to the picker finger 64 on the inside of the probe 38 and fits doubly around the mounting sleeve 114, the pivoting sleeve (threaded) 72 and the pivoting sleeve (countersunk) 70.

Figure 4:
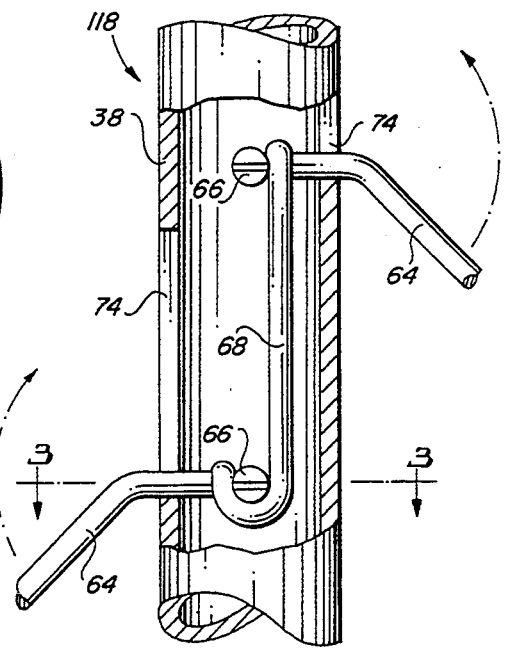
FIG. 4 is a cut away view of the probe and the means of mounting the picker finger inside the probe.

In reference to FIG. 4, the latex band 68 is extended under tension and hooked around the picker finger 64 of another identical picker finger assembly unit 118 as depicted in FIG. 3 and described above. The protruding part of the picker finger 64 in both cases are diametrically opposed and having the picker finger 64 in the same plane pointing in the same direction like unto an arrow head. The latex band 68 is used in pairs with the picker finger assembly 118. These pairs may have the protruding parts pointing radially outward in any chosen direction.

Figure 5:
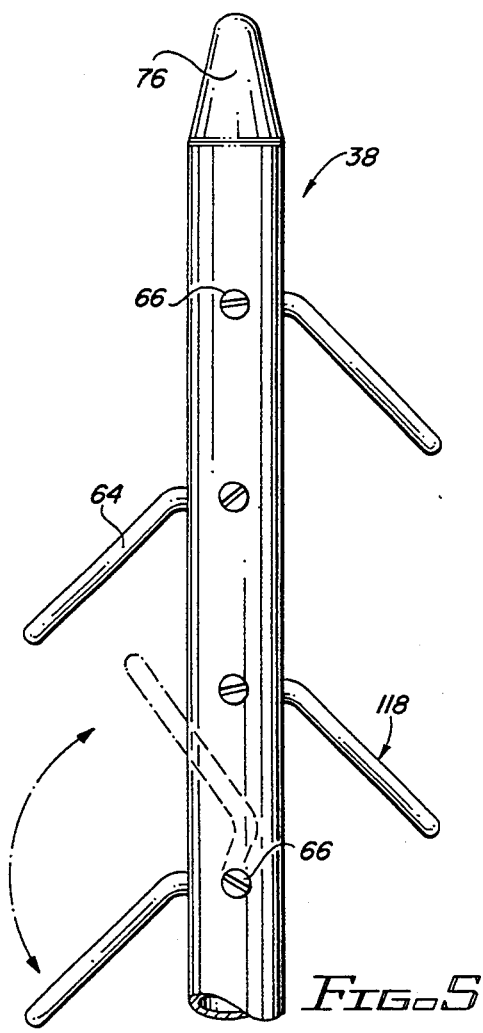
FIG. 5 is a plan view of the probe and a single action arrangement of the picker fingers and shows how a finger can swing away and be retracted inside the probe.

More units of the picker finger assembly 118 are provided on the probe 38 as depicted in FIG. 5. The probe 38 has a slick, low friction, smooth, pathfinder cone 76 affixed to the free end of the probe 38. The position of the pathfinder cone 76 in relation to the picker finger assembly 118 is shown too.

FIG. 14 shows how special provision is made by having a sleeve, bushing or carriage mounting fixed to the carriage 50. A pivoting shaft, or pivot bolt 120 connects the attachment bracket 84 pivotal to the carriage 50. The center line of a drive shaft 80 corresponds to the center line of the pivot bolt 120. The attachment bracket 84 is further connected to the roller chain 48 via special provision to fit to the links of the roller chain 48 in such a fashion that the distance from the center line of the pivot bolt 120 to the center line the roller of the roller chain 48 is substantially equal to half the pitch circle diameter of a drive sprocket 82 of the roller chain 48. Also see FIG. 13.

Figure 11:
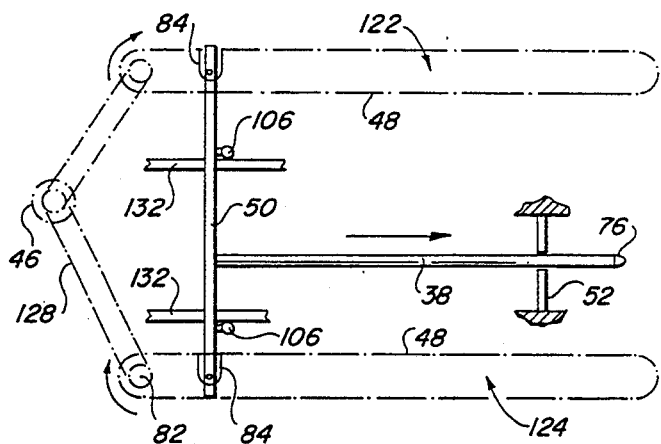
FIG. 11 is a side view of the driving mechanism during the extension cycle.

Referring to FIG. 11 and FIG. 24 four shafts 80 are provided and the roller chain 48 connecting these into two pairs of identical drive units 122 and 124. The top drive unit 122 and the bottom drive unit 124 are connected via a roller chain 126 from the top drive unit 122 and another roller chain from the bottom drive unit 124 to a drive unit, engine, motor gearbox or hydraulic motor 46. Hydraulic motor 46 is typically powered by tractor 30. Hydraulic motor 46 has an hydraulic relieve valve 108 connected in parallel to the oil circuit.

In reference to FIG. 11 which shows a simplified diagram of mounting, guiding and moving of a series of the probes 38. A grid, support, guide 52 comprises a structure with openings through which a series of probe 38 can protrude. The guide 52 is stationary in relation to and connected to a tilt frame 56. The probes 38 are connected to the carriage 50.

FIG. 2 shows that the tilt frame 56 is pivotal connected to a toolbar 36 and toolbar 36 to a tractor 30, as shown in FIG. 1. The base end of the probe 38 opposite to the pathfinder cone 76 is connected by a single bolt to a movable grid or carriage 50. The positions where the probe 38 are connected correspond to the pattern of openings in the guide 52. Consequently this series of the probe 38 are all connected to the carriage 50 and guided by the guide 52 in the same fashion.

FIG. 2 shows how this series of the probe 38 are orientated.

In reference to FIG. 24, the carriage 50 is typically supported by a number of bearings, wheels, low friction pads or bearing rollers 106. These bearing roller 106 use the tilt frame 56 as a race way 132. The carriage 52 can be moved both directions along a straight line indicated by the members of the tilt frame 56 and supported by the bearing roller 106. Typically the carriage 50 is connected in four positions via a special, bracket or attachment bracket 84 to a roller chain 48.

In reference to FIG. 15 and 16, the catcher frame 134 is connected to the carriage 50 by means of two protruding hitch brackets 136. This the hitch bracket 136 connects a part of the carriage 50 between them and any movement of the carriage 50 in the direction of the axis of the telescopic support 88 and the catcher frame 134 will be transferred to the catcher frame 134. A canvas, tarpaulin, cloth or catcher 40, is suspended at the corners by the catcher frame 134. The distance between the center lines of the catcher frame 134 are greater than the width of the carriage 50. The catcher 40 is located substantially below a plurality of probes 38 not shown in FIGS. 15 and 16.

Referring to FIG. 2, a canvas, tarpaulin or sheet metal is formed into a catcher funnel 42 that is suspended by the tilt frame 56 and the footrest 54. The catcher funnel 42 is positioned partly under catcher 40 with the funnel end facing towards a pivot center line of a hinge 138.

In reference to FIGS. 2 and 17, all of the carriage 50, the guide 52, the catcher frame 134 and catcher 40 referred to as the picker-catcher assembly 140, of which the tilt frame 56, an integral part, is pivotal joined to a tilt hinge 138. FIG. 17 illustrates how the complete the picker-catcher assembly 140 can be tilted by the utilization of an hydraulic tilt cylinder 44.

Further referring to FIG. 1, the picker-catcher assembly 140 is connected to a main frame, beam, cantilever or toolbar 36. Toolbar 36 is connected pivotal to a distant piece, positioning arm or positioning double hinge 34. An hydraulic cylinder 32A is connected to toolbar 36 and the positioning double hinge 34. The positioning double hinge 34 is connected pivotal to a hook up facility or tractor hitch 110 which in turn is connected to a tractor 30. Another hydraulic cylinder 34B is pivotal connected to the positioning double hinge 34 and the tractor hitch 110. Further in reference to FIG. 2 the drive shaft 80 is connected via bearings to the tilt frame 56. A support, stand or foot 54 is connected to the tilt frame 56 and forms an integral part of the tilt frame 56. A cylindrical telescopic support member 88 having its axis parallel to the raceway 132, is provide on each side of the tilt frame 56 and rigidly connected to the tilt frame 56 and the footrest 54. The length of the telescopic support 88 is sufficient to support another cylindrical member, pipe, tube or catcher frame 134, having an outer diameter smaller than the inner diameter of the telescopic support 88 and fits telescopically into the telescopic support 88. The length of the catcher frame 134 is sufficient to allow the catcher frame 134 to move telescopically in the telescopic support 88 for a distance at least equal to the center lines of the top drive unit 122 which is equal to the same distance of the bottom drive unit 124 in FIG. 11.

From the description above, a number of advantages of the first embodiment of the fruit harvester become evident:

(a) A simple design will allow a manufacturer to manufacture this picker with the basic tools, thus saving manufacturing cost.

(b) Simplicity reduces operating cost. The only wear and tear part, the probe, can be replaced within 45 seconds.

(c) The energy requirement of this machine is extremely low compared to pneumatic shakers.

(d) Only one operator is required to fully mechanize the harvesting operation.

(e) The ability and ease to position the picker around the canopy of the tree ensures that all fruit will be exposed to the picker.

(f) The emphasis of my picker is very much placed on minimizing mechanical damage to trees. The flexible probes, pathfinder cones, sunken picker finger pivots, non torque increasing swing away of the fingers and the hydraulic adjustable effort by which the prongs are inserted confirms this important feature.

(g) The catcher that is an integral part of the picker always follows the picking devices to ensure that the absolute minimum number of fruit is spilled in the ground.

(h) The cost of this fruit picker in comparison to more sophisticated high tech endeavors by previous inventors make it even more attractive.

(i) The rate of picking fruit with this picker is by far superior to other methods previously patented.

OPERATION—FIGS. 1–12 AND 15–22

In reference to FIG. 11 hydraulic motor 46 drives the carriage 50 via main drives 126, 128 and 122, 124 to cause it to perform a reciprocating movement. In reference to FIG. 2 the plurality of prongs 38 and a catcher 40 that are connected to the carriage 50 and guided by guide 52 performs the same reciprocating movement. A series of picking finger assemblies 188 mounted on the probes 38 penetrate the tree 60 engage fruit stems and pick the fruit. The picked fruit 58 drop onto the catcher 40 which perform the same movement as the probes. When the capacity of the catcher 40 is filled a tilt cylinder 44 is activated to tilt the complete picking-catching device 140 to be tilted as depicted in FIG. 17. Picked fruit 58 then rolls from the catcher 40 onto a funnel 42 and be discharged in to a container or bin 90.

In reference to FIG. 3 the probe 38 is typically made of a light-weight-low-cost-low-friction-flexible material such as a PVC pipe. No lubrication of pivot bushes 70 and 72 is required. The pivoting sleeve (countersunk) 70 and the pivoting sleeve (threaded) 72 being held together by the countersunk bolt 66 holds together the mounting sleeve 114 between them to form a unit. The pivoting sleeve (countersunk) 70 and the pivoting sleeve (threaded) 72 also acts as a bush or bearing and locate the picker finger 64 in the probe 38. No parts of the countersunk bolt 66, the pivoting sleeve (countersunk) 70 or the pivoting sleeve (threaded) 72 protrude from the outer surface of the probe 38, thus providing a smooth surface that will not cause any mechanical damage to fruit and limbs. The protruding part of the picker finger 64 that is located in the slotted hole 74 locates the picker finger assembly 118 and prevents movement along the pivot axis of the picker finger assembly 118.

Figure 10:
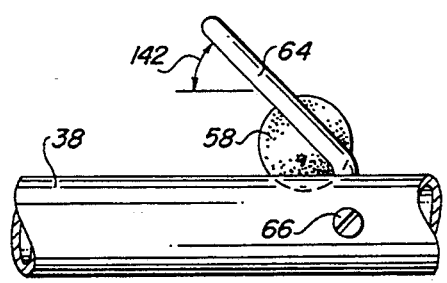
FIG. 10 is a plan view of a finger sized to pick smaller mature fruit.

Another embodiment of the picker finger assembly 118 not shown here is to have the hole in the pivoting sleeve (threaded) 72 and the pivoting sleeve (countersunk) 70 eccentric in relation to the center line of the outer cylindrical surface, thus providing unlimited adjustability of the size of the throat area 144 and the angle of attack 142 angle as depicted in FIG. 10.

In FIG. 4 it can be noticed that the slotted hole 74 placed in relation to the picker finger assembly 118 so as to act as a stop for the free end of the picking finger 64 under the urging force of the latex band 68. The length of the slotted hole 74 is sufficient to allow picker finger 64 to be housed temporarily inside the probe 38 during a swing away which may be caused by a tree limb 78. This retraction of the picker finger 64 ensures that an obstacle may totally be avoided. The latex band 68 is being pulled around the pivot assembly in order to force the picker finger 64 up against the end of the slotted hole 74. The other side of endless the latex band 68 is anchored under strain around an adjacent the picker finger assembly 118 with in the same result. This pre tension is selected to be sufficient for the picking of the fruit but small enough to be swung away should it encounter a tree limb 78. See the swing away in FIG. 5.

The spring, the latex band 68 is pulled around the pivoting sleeve (countersunk) 70 and the pivoting sleeve (threaded) 72 during a swing away and increases the length of the latex band 68 only slightly. Also the lever arm of the force in the latex band 68 remains constant being wrapped around the cylindrical pivoting sleeve (countersunk) 70 and the pivoting sleeve (threaded) 72. These two factors result in negligible torque increase during a swing away which help reduce potential damage that the picker finger 64 can do to the tree.

Referring to FIG. 10 fruit hanging by a stem from a fruit tree is directed by the picker finger 64 during a relative movement of it in relation to the fruit toward the throat area 144. The stem engages in this reducing passage until the stem meets with the picker finger 64. The fruit get forced up against the probe 38 and the picker finger 64 and while the movement continues the force overcomes the force offered by the fruit-stem connection and it dislodges.

An embodiment of the picker finger assembly 118 is shown if FIG. 5. This embodiment result in a single picking action, penetrating the canopy like an arrow and picking fruit during the withdrawal cycle.

Figure 6:
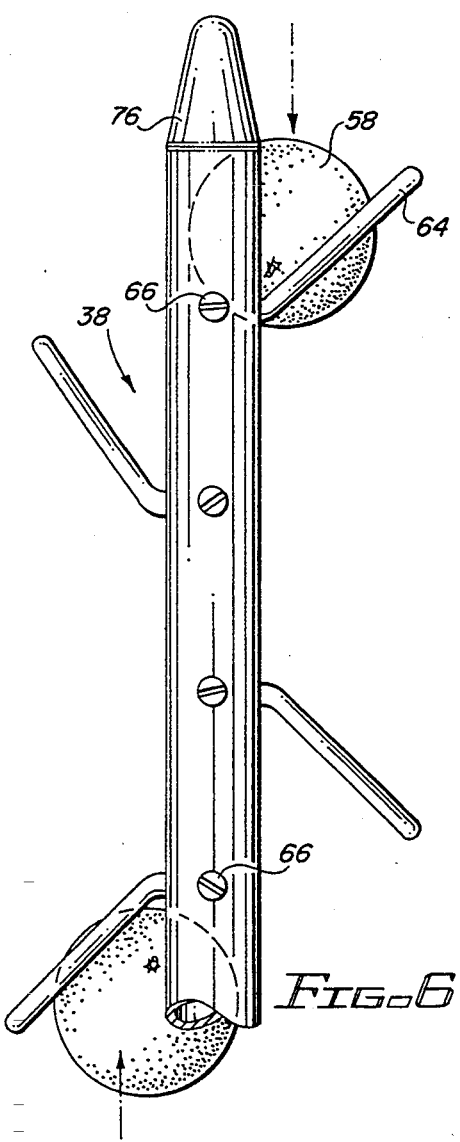
FIG. 6 is a plan view of the probe and a double action arrangement of the picker fingers.

Another embodiment of the picker finger assembly 118 is shown if FIG. 6. This embodiment result in a double picking action; picking fruit during the penetration and withdrawal cycles making the machine more time efficient. The double picking action reduces the number of reciprocating cycles required to pick all fruit thus limiting mechanical damage to the tree.

Figure 8:
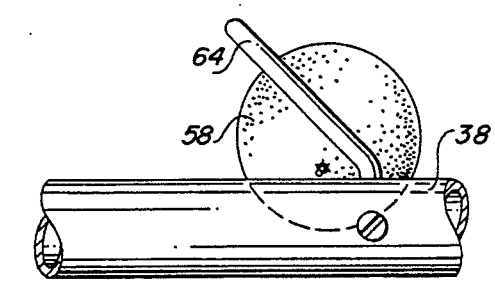
FIG. 8 is a plan view of a finger sized to pick larger mature fruit.
Figure 9:
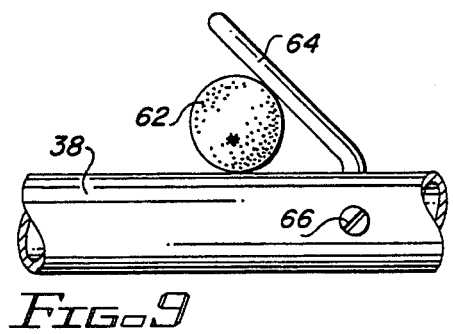
FIG. 9 is a plan view of a finger sized to pick larger mature fruit and not picking the smaller immature fruit.

In reference to FIG. 8 the size of the picker finger 64 matches that of mature fruit 58 and the fruit is picked. The situation depicted in FIG. 9 shows a smaller or immature fruit 62 which slips through the throat area and is not picked.

FIG. 10 shows a small fruit being combined with a smaller picker finger 64 that results in picking the fruit. Thus adjustability and selectability in fruit size is accomplished.

Figure 13:
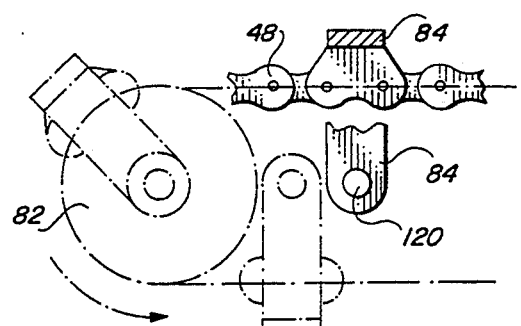
FIG. 13 is a side view of the attachment device.

FIGS. 13 and 14 illustrates an embodiment of how the carriage 50 can be connected to the roller chain 48 on order to follow the roller chain 48 throughout it complete trip around a pair of the sprockets 82. This embodiment transforms rotation of the drive shaft 80 to translation of the carriage 50. The fact that the center line of the pivot bolt 120 corresponds with that same of the drive shaft 80, the attachment bracket 84 simply follows the path of the roller chain 48 around the sprocket 82 and thus change the direction of movement of the carriage 50 with out having to change the direction of rotation of the drive shaft 80 or the hydraulic motor 46. This results in simplified and smooth operation.

Figure 12:
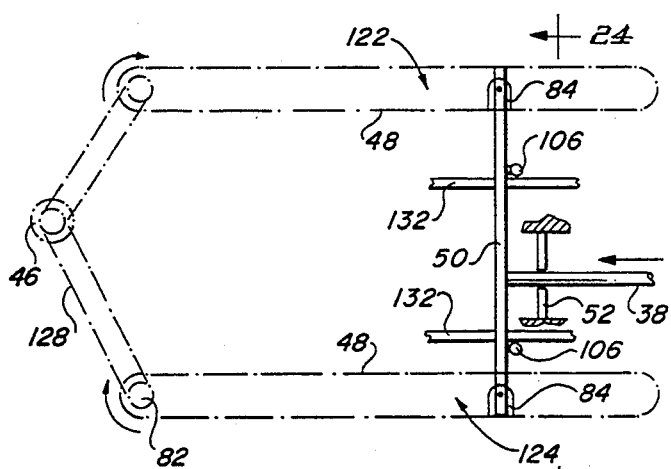
FIG. 12 is a side view of the driving mechanism during the withdrawal cycle.

FIG. 11 shows the hydraulic motor 46 which is used to drive the top drive unit 122 and the bottom drive unit 124. The ratio is such that the speed of the top drive unit 122 to the bottom drive unit 124 equals 1:1. The positive connection of the top main drive chain 126 and the bottom main drive chain 128 ensures that they can be set in a predetermined non changing relation to each other. The top main drive chain 126 and the bottom drive unit 124 in turn drive the top drive unit 122 and the bottom drive unit 124. The ratio again is 1:1. The carriage 50 being connected via the attachment bracket 84 to the top drive unit 122 and the bottom drive unit 124 is caused to perform a reciprocal movement, the reach of which is equal to the center line of a pair of the drive shaft 80. A series of probes 38 which is connected to the carriage 50 performs the same reciprocal movement, while being guided by a stationery the guide 52. FIG. 12 shows the withdrawal cycle of the series of probes 38. The carriage being supported by roller bearings 106 and using part of the frame 56 as raceway 132 for bearings 106. The carriage cannot alter the direction of it course during any one cycle seeing that the same is well guided by a plurality of bearing rollers 106. If any lateral movement of the carriage take place it will result in lateral movement of the extended probes and may result in excessive damage to the tree. The configuration in FIG. 11 achieves exactly that and ensures that the probes are extended and withdrawn in exactly the same path.

Also further with reference to FIG. 11 the probes may be subjected to material stresses at its base if simply connected rigid to the carriage 50 without a guide 52 to support throughout the extend of its reciprocal movement. This embodiment avoids the same.

Figure 7:
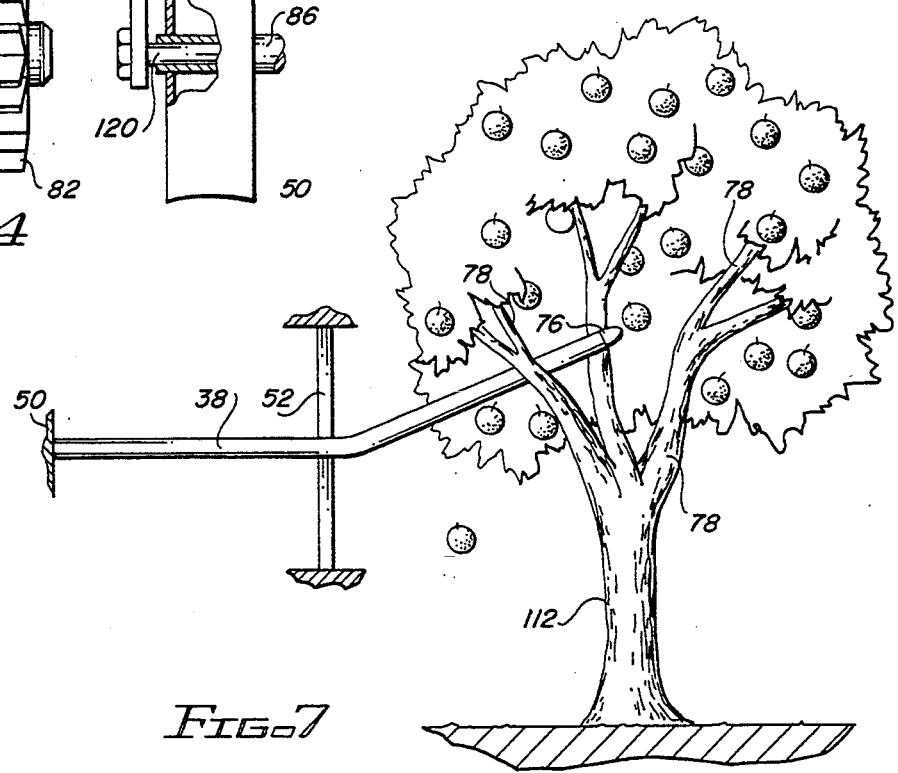
FIG. 7 is an end view of the probe being flexed to bypass obstacles like branches and limbs.
Figure 26:
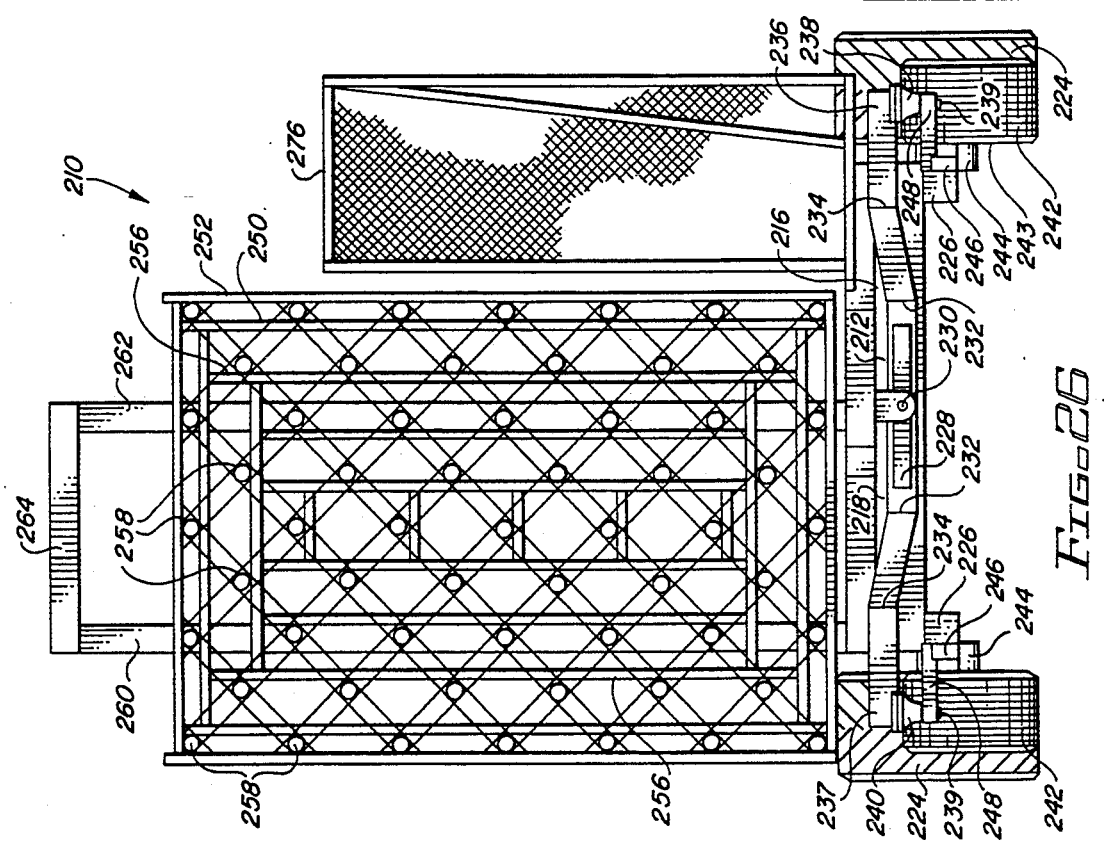
FIG. 26 is a front elevation of a second embodiment of a mechanical fruit harvester in accordance with the present invention.

Referring to FIG. 7, the function of the flexibility of the probe 38 and of the pathfinder cone 76 mounted at the end is illustrated. As the probe 38 is penetrating the canopy as a result of the movement of the carriage 50, each the probes 38 finds its way pass limbs, fruit and twigs. The flexible characteristic of the probe 38 helps to accommodate forced misalignment without damage to the tree or machine. The hydraulic relieve valve 108 shown in FIG. 26 is a further safety precaution to help slow down or stop the hydraulic motor in the event of an obstacle or tree limb 78 that can not be avoided.

Another embodiment not shown here represent a different phasing of the top drive unit 122, the bottom drive unit 124 and the carriage 50 in relation to each other. This arrangement may result in changing the timing at which the probes relative to each other penetrating the canopy. That is that some may be withdrawn at the same time when some are penetrating the tree canopy of the fruit tree 60. The benefits of this arrangement is amongst others is to prevent the limbs from being "bulldozed" by a "wall" of penetrating the probe 38. This feature may also reduce the amount of pull on limbs thus reducing mechanical damage.

In reference to FIGS. 15 and 16, the catcher frame 134 that is connected via the hitch bracket 136 to the carriage 50 performs the same reciprocal movement as the carriage 50 and consequently the series of the probe 38. The telescopic support 88 supports the catcher frame 134 and is stationary relative to the tilt frame 56 and the footrest 54. The catcher funnel 42 is located partly underneath catcher 40 and is stationary in relation to the catcher. Seeing that catcher 40 does not incorporate any rigid members at the extending end it can be extended all the way to the tree trunk 112 with out causing damage to it. Consequently reducing of eliminating the spill of picked fruit.

In reference to FIG. 2, the picked fruit 58 drop on catcher 40 as it finds its way down through the series of the probe 38 and limbs. The slowing down effect of the series of the probes 38 and the limbs and leaves prevent the fruit from gaining too high a velocity when dropping and also guide the picked fruit 58 down to be intercepted by catcher 40. The catcher 40 is always under the picker finger assembly 118 since it performs the same reciprocating movement and is in phase with the probes 38. In an embodiment not shown here, catcher 40 and the catcher frame 134 can be controlled separately from the carriage 50. Picked fruit 58 gather in catcher 40 until the buffer store capacity of the catcher 40 is filled.

Figure 18:
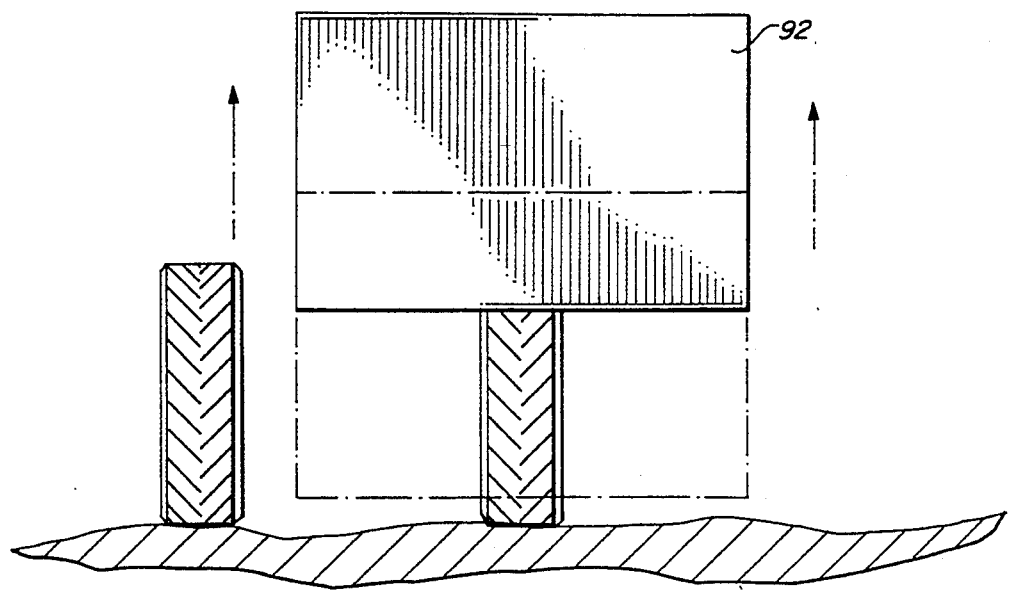
FIG. 18 is a diagrammatic end view of the picking device being positioned vertically.

Further in reference to FIG. 18, the picker is raised to the elevation of a fruit bin 90 in FIG. 17. FIG. 17 further illustrates how the picker-catcher assembly 140 is tilted by the hydraulic tilt cylinder 44 to cause picked fruit 58 to roll onto the catcher funnel 42 and be guided by the catcher funnel 42 toward its funnel end and be discharged into the fruit bin 90.

Figure 19:
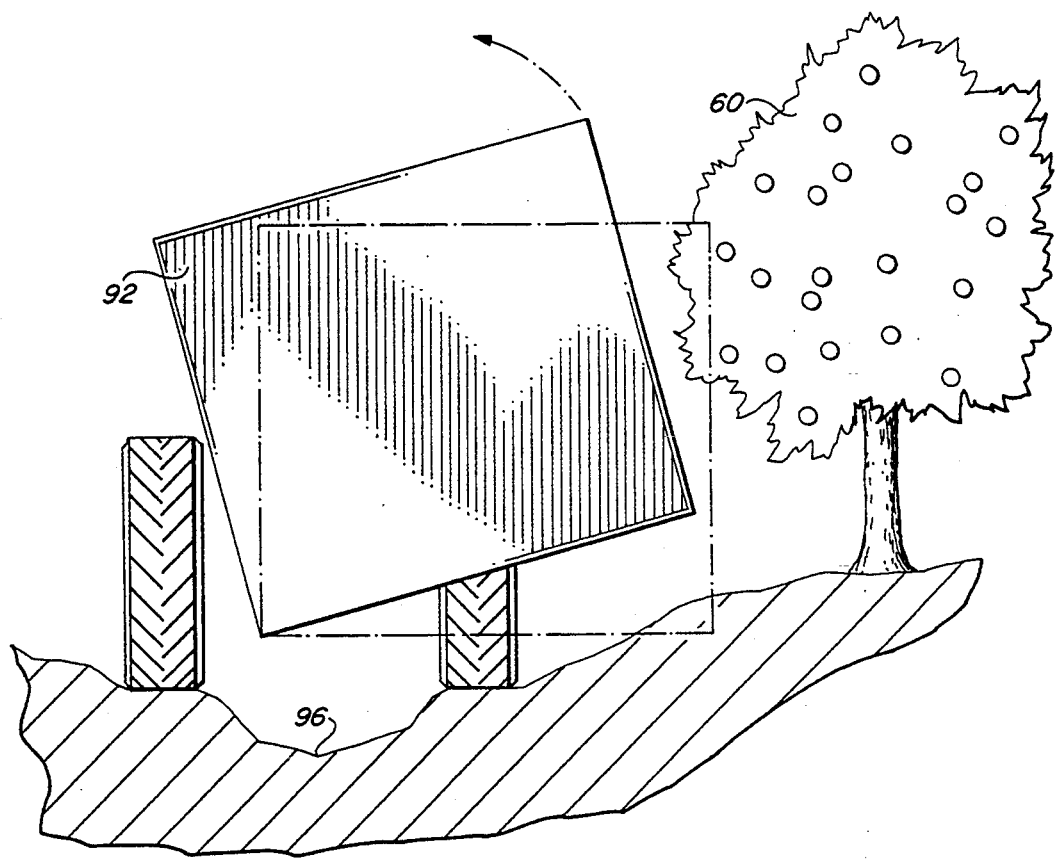
FIG. 19 is a diagrammatic end view of the picking device being angularly adjusted in the vertical plane.

Some fruit may be difficult to reach or is simply not exposed to being picked. The repositioning of tractor 30 in the horizontal plane and or the repositioning of the picker-catcher assembly 140 in the vertical plane using the hydraulic lift of tractor 30 as shown in FIG. 18 and or using the hydraulic tilt cylinder 44 as shown in FIG. 19 may help expose unpicked fruit 62 to the picker finger assembly 118. The tilt cylinder 44 may also be using to aim the picket at trees planted on a planting bed 94 as depicted in FIG. 19. Thus adjustability by the tractor operator is made with ease.

In reference to FIG. 1, the positioning double hinge acts as an adjustable distant piece or arm between the tractor hitch 110 and toolbar 36. The relative position of toolbar 36 to the tractor hitch 110 can be altered by the use of toolbar portioning cylinder 32A and the hitch positioning cylinder 32B. This ability enables the operator to reposition the picking-catching device (diagrammatic) 92 to be able to perform among others the various positions of the picking-catching device 92 in relation to the fruit tree 60 as shown in FIGS. 20 through 23. This feature assists to pick thoroughly.

If it be assumed that FIG. 20 represents the normal position 98 of the hinge 34 then the reach of the probe 38 can effectively be increased by adjusting the toolbar positioning cylinder 32A for positioning toolbar and the hitch positioning cylinder 32B to achieve the position shown in FIG. 21. This position may be referred to as the extended position 100 and may be used to effectively increase the reach of the reciprocal movement without having to reposition the tractor 30.

In order to do the least amount of damage to a tree the probe 38 should always be inserted and withdrawn radially in relation to the trunk. This way limbs are not twisted and possibly torn. This purpose is achieved by activating the toolbar positioning cylinder 32A for positioning toolbar and the hitch positioning cylinder 32B to achieve the positions shown in FIGS. 22 and 23. The position shown in FIG. 22 may be referred to as the forward position 102. Likewise the position shown in FIG. 23 may be referred to as the backward position 104.

Another embodiment not shown here is to omit the positioning double hinge, the toolbar positioning cylinder 32A for positioning toolbar and the hitch positioning cylinder 32B and thus hitching the toolbar 36 directly to the tractor hitch 110 to tractor 30. This embodiment will not have the angular and positional adjustments shown in FIGS. 20–23. This is a more simple application and my be satisfactory if the fruit trees are grown in a hedge.

Yet another embodiment not shown her is to supply a rest or foot to the tractor hitch 110 in order to stabilize tractor 30 during positional and angular adjustment as shown in FIGS. 20–23.

Figure 25:
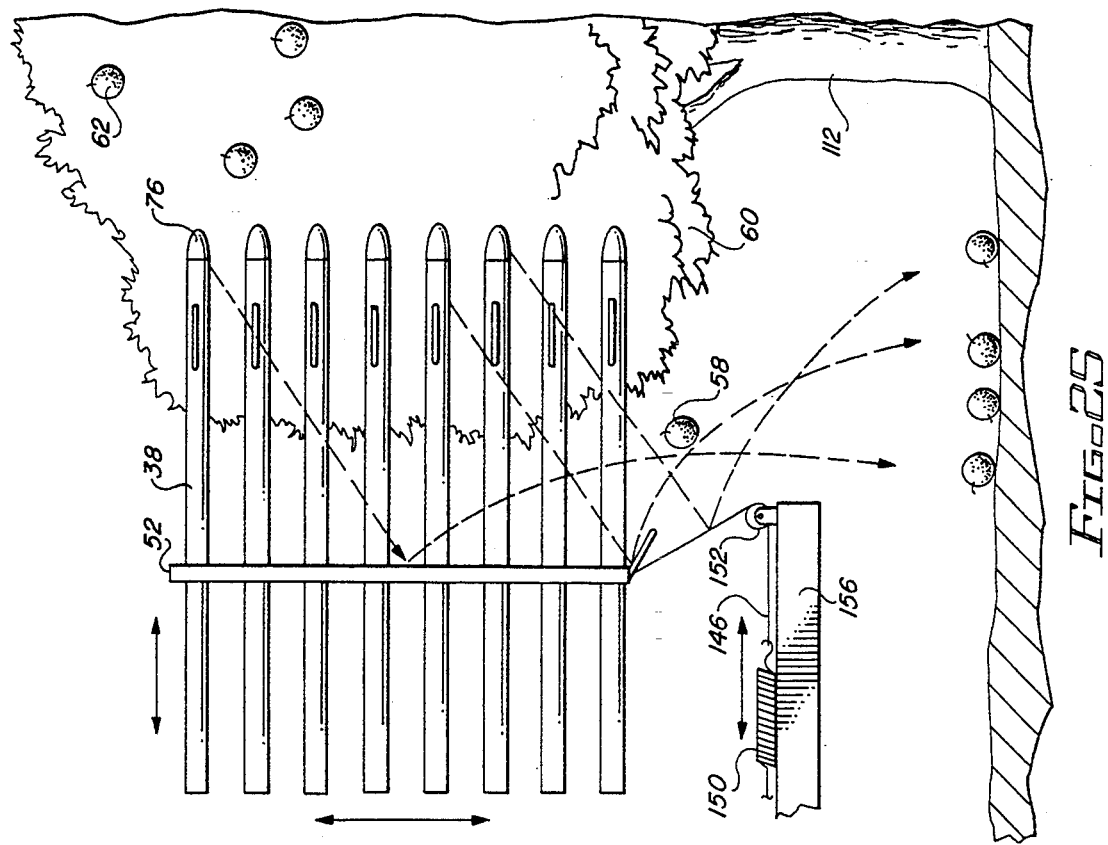
FIG. 25 is a side view illustrating a flexible shield arrangement specifically adapted for use with the first embodiment of FIGS. 1–24, and which is also useful for the second embodiment of FIGS. 26–30.

FIG. 25 is a side view illustrating the use of fruit shields with the fruit-picking unit of the present invention, in order to insure that falling fruit is directed away from the harvester. To this end, the harvester is provided with a roller 152 mounted forwardly, with a flexible shield 146 (such as a netting) attached to the bottom of the guide 52, and extending about the roller 152 and coupled to a load spring 150. As the fruit-picking unit including the guide 52 is raised and lowered, the flexible shield 146 rolls upwardly with the unit, to thereby permit a means for deflecting fruit as shown by the arrows in FIG. 25. Similarly, the guide 52 may be provided with an outwardly-extending deflector 148, to insure that fruit is deflected away from the harvester.

Free-standing embodiment of fruit harvester employing restricted dimensions.

A free-standing harvester in accordance with the second embodiment of the present invention is shown in FIGS. 26–30 and referred to there generally by the reference numeral 210. The harvester 210 comprises a chassis formed of a front horizontal member 212, a rear horizontal member 214 and opposing first and second side frame members extending between the front and rear. There is provided a prime mover 220, preferably a small gasoline engine, which in this embodiment is mounted on the rear chassis member 214 and shown by dotted lines. The motor 220 drives a hydraulic pump 222; it will of course be understood that a conventional motor and hydraulic pump may be employed. The specific details of the hydraulic actuation and operating system will be described in greater detail below with reference to FIG. 30.

With continuing reference to FIGS. 26–29, the harvester 210 includes a pair of rear wheels 224 operated by hydraulic drive motors 226. It will of course be appreciated that the drive wheels may also be positioned at the front, and that the short radius turning wheels mounted on the front of the chassis may alternatively be mounted on the rear of the chassis. In the embodiment of FIGS. 26–29, the short radius turning wheel assembly of the present invention is mounted to the chassis adjacent the front chassis member 212, as is discussed next.

The short-radius wheel assembly includes an elongated front wheel support 228 having opposing ends 236 and 237. As is specifically depicted in FIG. 26, the front wheel support 228 is pivotally mounted at 230 to the chassis, and includes two bins 232, 234, between the pivot 230 and the respective ends 236, 237 in order to provide an elevation of the ends 236, 237 with respect to the center line of the front wheels 242. A bearing pad 238 is mounted along an axis 240 at each of the respective ends 236, 237, and is rotatably coupled with an offset arm arrangement which provides a particularly facile short-radius turning technique. To this end, each of the front wheels 242 includes an axle 244 that extends through the wheel and outwardly from a first side 243 of the respective wheel. A first offset arm 246 is fixed at one end to the extending portion of the axle 244; the first offset arm extends generally parallel with the first side 243 of the wheel 242. The second end of the first offset arm 246 is coupled to one end of a second offset arm 248, the other end of which is rotatably coupled to a pin extending from a pivot pin 239 extending from the bearing pad 238; the second offset arm 248 extends generally parallel with the axle 244, with both offset arms being dimensioned so that substantially all of each front wheel 242 rotates completely about the point 240 at the respective ends 236, 237 of the front wheel support 228.

The harvester 210 includes a fruit-picking unit like that of the embodiment of FIGS. 1–24, in which there is provided a vertically extending frame 256, a carriage 250 mounted to the frame 256 and a probe guide 252, with plural probes 258 mounted with the carriage and frame, and extending through appropriate apertures in the guide 252 as the carriage is moved from the rear of the chassis toward the front end by operation of the chain drive assembly 254, which functions in essentially the same manner as that described above with reference to FIGS. 11–14.

Figure 27:
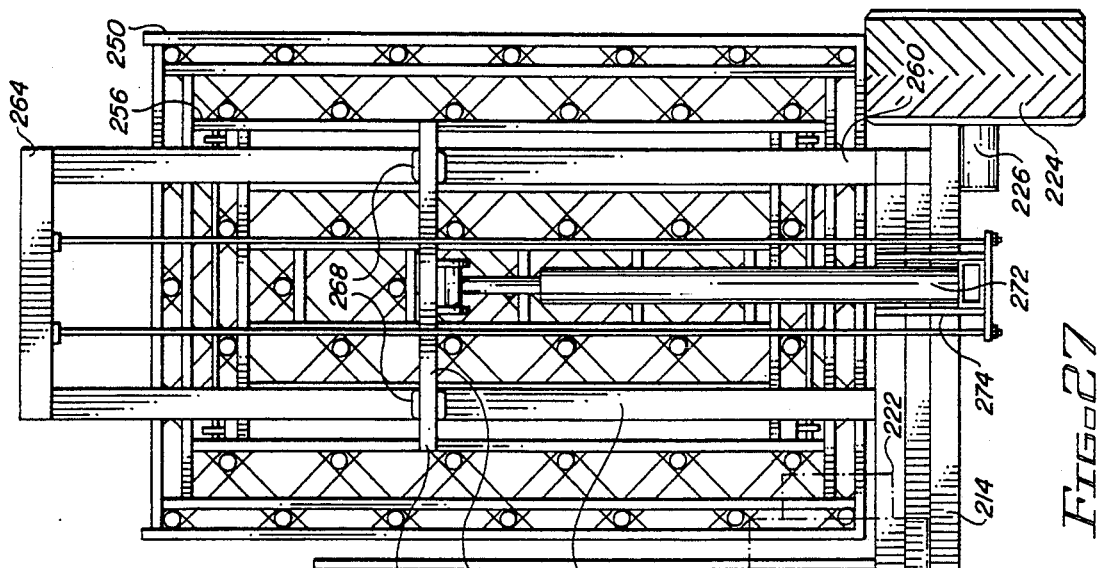
FIG. 27 is a rear elevation of the embodiment of FIG. 26, in which a motor and hydraulic pump portion of the harvester is depicted in dotted lines.

With reference to FIGS. 27, 28 and 29, the harvester 210 includes a frame assembly for supporting the fruit-picking unit and raising and lowering the frame 256. The frame assembly includes a pair of vertically extending members 260, 262 mounted to the rear of the chassis and a horizontal brace 264 across the top of the two vertical members 260, 262. A pair of intermediate horizontal arms 266 are fixed between the frame 256 and the extremity of a hydraulic piston 270 via a cross-arm 269. Bearings 268 insure low-friction movement. The hydraulic piston 270 is operated by a cylinder 272.

The harvester 210 further includes an operator station 276 along the second side between the rear and front of the chassis, and includes a seat 278 and controls 282 for operating the various hydraulic functions which will now be described with reference to FIG. 30.

Figure 30:
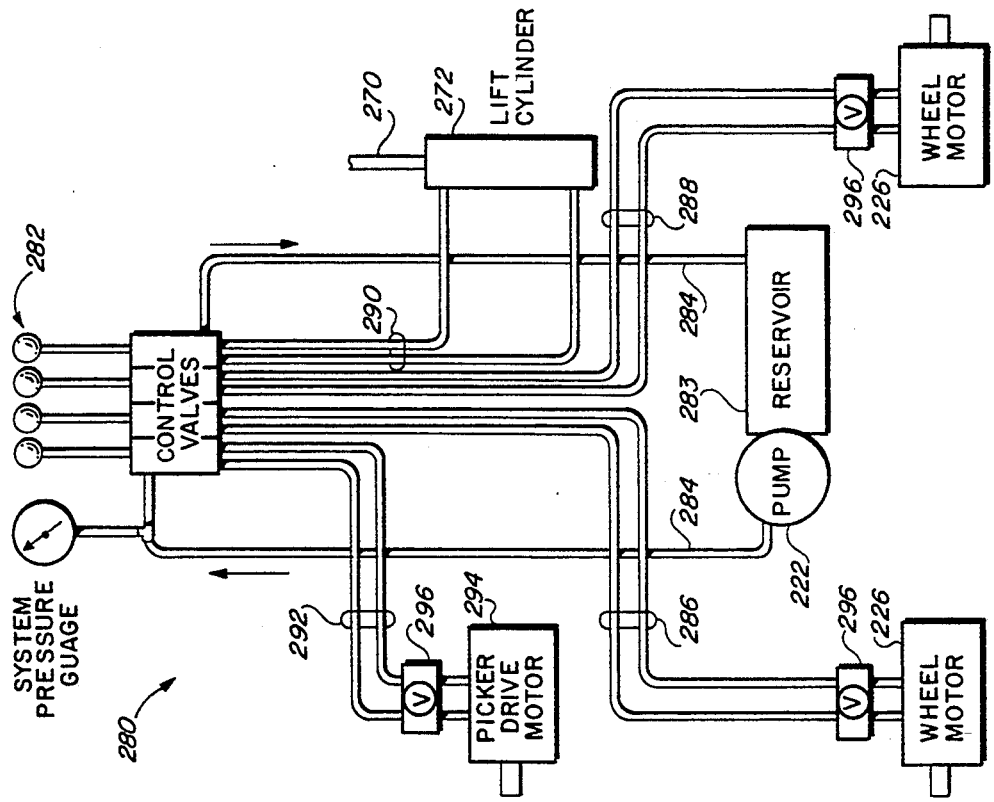
FIG. 30 is a schematic illustration of a hydraulic system useful with the embodiment of FIGS. 26–29.

The hydraulic system for use with the harvester 210 is referred to in FIG. 30 generally by the reference numeral 280. The hydraulic system 280 includes the pump 222, wheel motors 226 and controls 282 which have been described above. Additionally, the system 280 includes various hydraulic lines, including the following: pressurization lines from the pump 222, through the control lever panel through the control valves of the control levers 282, to reservoir 283 and then returned to the pump 222; wheel motor pressurization lines 286 and 288; lines 290 for operation of the lift cylinder 272; and lines 292 for operation of the picker drive motor 294. In accordance with an important aspect of the hydraulic system used with the present invention, each of the drive wheel motors 226 and the picker drive motor 294 are fitted with a cross-differential relief valve 296 in the respective hydraulic service lines 286, 288 and 292, in order to protect the respective motors from shock load. In the case of the picker drive motor 294, this cross-differential relief valve provides a very significant safety feature, in that the associated relief valve 296 will stop the operation of the drive motor if a solid object is encountered by the probes 258. Similarly, the maximum torque to the wheel motors 226 is adjusted to minimize wheel spin, and to permit smooth operation during changes in direction or speed.

A system pressure gauge 298 provides an indication to the operator of the pressure status of the system.

Figure 31:
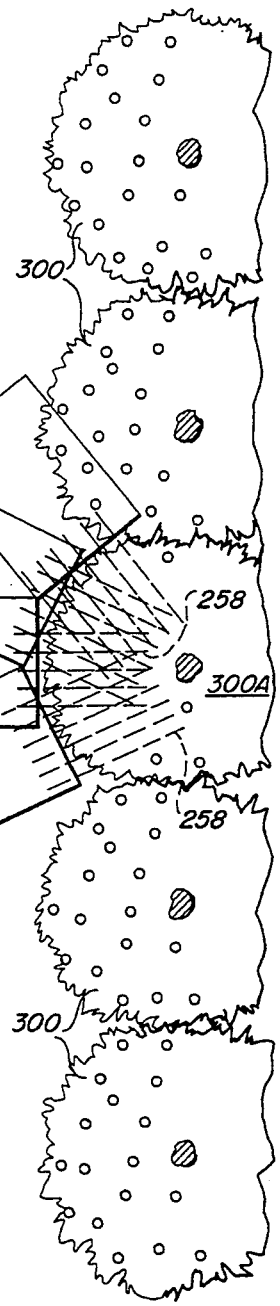
FIG. 31 is a top view illustrating the manner of use of the fruit harvester of the second embodiment depicted in FIGS. 26–30.

In accordance with the present invention, the harvester 210 depicted in FIGS. 26-30 is specifically restricted in dimensions so as to have a length between the front and rear which does not exceed about 75 percent of a spacing distance between adjacent fruit trees, and is preferably even less in overall dimensional length. Likewise, the width of the free-standing harvester 210 is also restricted to insure ease of mobility. By way of example, when the harvester 210 is used with citrus trees having a tree-to-tree spacing of about 10 to 12 feet, the harvester has an overall length of 8 feet or less, and a width of 7 feet or less. The harvester 210 will thus have a "footprint" of about 55-56 feet, and is extremely maneuverable in a direction parallel with the direction between the front and rear of the chassis, and which may also be rotated in a short turning radius so as to permit rotation of the chassis about an imaginary axis at the rear of the chassis to thereby permit the restricted-dimension chassis to move about substantially all of an individual fruit tree among a plurality of densely-spaced fruit trees. This feature is illustrated in FIG. 31, where plural fruit trees 300 having a typical spacing are shown in plan view. As there depicted, the harvester 210 may be moved very close to the foliage of a tree 300 adjacent to an individual tree 300A being harvested. The flexible probes 258 are then extended into the foliage in the desired manner at a first location, and then the harvester 210 is rapidly moved to another position in a facile manner; this process is continued about substantially all of the periphery of the individual tree 300A, with the free-standing and restricted-dimensioned construction of the harvester 210 facilitating easy access to essentially all of the foliage, and thus the fruit, of the individual tree 300A being harvested by utilizing a series of forward, rearward and rotational direction changes for positioning the harvester 210 and the related fruit-harvesting unit at different radial locations relative to that individual tree.

Accordingly, the reader will see that fruit pickers and harvesters of this invention can be used to pick fruit in a very simple and effective way. Great emphasis is placed on providing a tree friendly apparatus, in which essentially all possible causes of mechanical damage are avoided. Both embodiments of this invention are of a straightforward and simple construction and design, in order to have minimum maintenance requirements and that can be easily worked on in a conventional agricultural workshop.

In both embodiments, the picking unit can be easily repositioned during the end of the withdrawal cycle and before the next penetration cycle in order to create an adjustment of the position of the picking probes relative to an unpicked fruit in order to pick the same; the second embodiment particularly accomplishes this in a facile and cost-effective manner.

The above description should not be construed as limiting the scope of the invention, but as merely providing illustrations of preferred embodiments of the invention. Thus, the scope of the invention is to be determined by the appended claims and equivalents, rather than by the examples given.

What is claimed is:

1. A mechanical fruit harvester, comprising:
   a chassis having a front and a rear and opposing first and second sides between the front and the rear;
   a pair of spaced, ground-engaging wheels at the rear of the chassis for propelling the harvester;
   short-radius turning means fitted to the front of the chassis;
   a fruit-picking unit mounted on the chassis along the first side, the unit extending from a proximal end at the rear of the chassis and forwardly to a distal end beyond the front of the chassis, the unit including plural, elongated and generally parallel probes extending through the unit from the proximal end to the distal end;
   means for raising and lowering the fruit-picking unit relative to the chassis;
   means for extending the probes out of the distal end of the unit and into the foliage of an adjacent fruit tree; and
   means carried by the chassis for operating a rear wheel, the raising and lowering means and the probe-extending means.

2. The mechanical fruit harvester recited in claim 1 further comprising an operator station on the chassis along the second side.

3. The mechanical fruit harvester recited in claim 2 wherein the harvester has an overall dimension from the distal end of the fruit-picking unit to the rear of the chassis which is not greater than 7.5 feet.

4. The mechanical fruit harvester recited in claim 2 wherein the harvester has an overall dimension between the first and second sides which is not greater than 6.25 feet.

5. The mechanical fruit harvester recited in claim 1 further comprising a generally vertically-extending fruit shield on the distal end of the unit, the shield having plural apertures each of which is dimensioned and positioned to receive one of the probes.

6. The mechanical fruit harvester recited in claim 5 further comprising a flexible shield extending between the front of the chassis and the unit and joined at one end to the unit, and means for reeling the flexible shield out of and into the chassis as the fruit-picking unit is raised and lowered.

7. The mechanical fruit harvester recited in claim 5 wherein the shield further comprises a bevelled curve below the probes for directing falling fruit away from the harvester.

8. The mechanical fruit harvester recited in claim 1 wherein the raising and lowering means comprises:
- a vertical frame supported upon the chassis with the fruit picking unit movably supported in the vertical frame;
- a hydraulic piston for raising and lowering the fruit-picking unit along the vertical frame; and
- means coupling the hydraulic piston to the operating means.

9. The mechanical fruit harvester recited in claim 8 wherein the vertical frame is mounted at the rear of the chassis.

10. The mechanical fruit harvester recited in claim 1 wherein the operating means comprises:
- a motor carried by the chassis, the motor having a drive shaft;
- a hydraulic pump coupled to the drive shaft;
- hydraulic lines coupled between one of the rear wheels, the raising and lowering means and the probe-extending means and the hydraulic pump; and
- control valve means in the hydraulic lines for directing hydraulic fluid to a selected one of the rear wheels, the raising and lowering means and the probe-extending means.

11. The mechanical fruit harvester recited in claim 1 wherein the short-radius turning means comprises a castor wheel centrally coupled along the front of the chassis.

12. The mechanical harvester recited in claim 1 wherein the short-radius turning means comprises:
- an elongated front wheel support pivotally coupled to a central point of the chassis along the front, the front wheel support having opposing ends; and
- a pair of wheel assemblies, each assembly rotatably fixed to one end of the front wheel support.

13. The mechanical fruit harvester recited in claim wherein each wheel assembly comprises:
- a bearing member coupled to a point on the corresponding end of the front wheel assembly;
- a wheel having a first side and an axle, with a portion of the axle extending outwardly from the first side;
- offset means rotatably coupled to the bearing member and the extending portion of the axle, the offset means dimensioned to permit substantially all of the wheel to rotate about an imaginary axis passing through the point on the corresponding end of the front wheel support.

14. The mechanical fruit harvester recited in claim 13 wherein the offset means comprises:
- a first offset arm generally parallel with the first side of the wheel and having a first end rotatably coupled with the extending portion of the axle, the first offset arm further including a second end; and
- a second offset arm generally parallel with and spaced from the axle, the second offset arm having a first end fixed to the second end of the first offset arm, the second offset arm having a second end coupled to the bearing member.

15. The mechanical fruit harvester recited in claim 14 wherein the dimension between the extending portion of the axle and the second offset arm is at least equal to the radius of the wheel.

16. A method for mechanically harvesting fruit from a plurality of densely spaced fruit trees, the method comprising the steps of:
- providing a free-standing fruit harvesting unit having a chassis with a front and rear and first and second sides between the front and rear;
- supporting the front and rear of the chassis with respective front and rear wheels;
- restricting the dimensions of the chassis so as to have a length between the front and rear which does not exceed about 75 percent of a spacing distance between adjacent fruit trees;
- extending fruit picking means forwardly from the restricted dimensions of the chassis for engaging fruit in an individual fruit tree; and
- moving the restricted-dimension chassis in forward and reverse directions generally parallel with the direction between the front and rear, and rotating the chassis about an imaginary axis extending normal to, and within the restricted dimensions of the chassis to thereby permit the restricted-dimension chassis to move about substantially all of the individual fruit trees among a plurality of densely spaced fruit trees.

17. The method recited in claim 16 further comprising the step of restricting the dimension of the chassis between the first and second sides to a dimension which does not exceed about 6.25 feet.

18. The method recited in claim 16 wherein the fruit-picking means extending step comprises the step of extending plural, flexible probes forwardly from the chassis and into foliage of the individual tree.

19. The method recited in claim 16 wherein the moving step comprises a series of forward, rearward and rotational direction changes for positioning the chassis and fruit-harvesting unit at different radial locations relative to the individual tree.

* * * * *